(12) United States Patent
Gehringhoff

(10) Patent No.: US 7,077,920 B2
(45) Date of Patent: Jul. 18, 2006

(54) METHOD OF MAKING COATED STEEL PART WITH REGIONS OF DIFFERENT DUCTILITY

(75) Inventor: Ludger Gehringhoff, Paderborn (DE)

(73) Assignee: Benteler Automobil Technik GmbH, Paderborn (DE)

( * ) Notice: Subject to any disclaimer, the term of this patent is extended or adjusted under 35 U.S.C. 154(b) by 259 days.

(21) Appl. No.: 10/774,175

(22) Filed: Feb. 6, 2004

(65) Prior Publication Data

US 2004/0159378 A1    Aug. 19, 2004

(30) Foreign Application Priority Data

Feb. 12, 2003    (DE) ................................ 103 05 725

(51) Int. Cl.
*C21D 1/68*    (2006.01)
(52) U.S. Cl. ...................... 148/530; 148/533; 148/534; 148/639
(58) Field of Classification Search ................ 148/530, 148/533, 534, 639
See application file for complete search history.

(56) References Cited

U.S. PATENT DOCUMENTS

| | | | | |
|---|---|---|---|---|
| 3,972,744 A | * | 8/1976 | Cantrell ...................... 148/572 |
| 4,036,670 A | * | 7/1977 | De Walt ...................... 148/625 |
| 4,718,950 A | * | 1/1988 | Nishikawa .................. 148/565 |
| 5,972,134 A | | 10/1999 | Buschsieweke | |
| 6,524,404 B1 | * | 2/2003 | Gehringhoff et al. ........ 148/320 |
| 2002/0108683 A1 | * | 8/2002 | Finkl et al. .................. 148/526 |

\* cited by examiner

*Primary Examiner*—George Wyszomierski
(74) *Attorney, Agent, or Firm*—Andrew Wilford

(57) ABSTRACT

A workpiece having regions of different ductility is made by first coating opposite faces of a flat sheet-metal workpiece of low ductility and then stripping the coating from the faces in one region of the workpiece while leaving the coating on the faces in another region of the workpiece. The workpiece is then deformed into a three-dimensional profile. Only the one uncoated region of the workpiece is heated and thereby hardened while not significantly heating the other coated region of the workpiece.

5 Claims, 2 Drawing Sheets

METHOD OF MAKING COATED STEEL PART WITH REGIONS OF DIFFERENT DUCTILITY

FIELD OF THE INVENTION

The present invention relates to a coated steel part. More particularly this invention concerns a method of making a coated steel part with regions of different ductility.

BACKGROUND OF THE INVENTION

It is known to make various motor-vehicle parts—e.g. tie rods, B-columns, struts, door beams—of hardened steel with uniform ductility and grain structure throughout the entire workpiece. The main factor affecting grain structure and/or ductility is the maximum temperature to which the workpiece is heated, that is whether or not it reaches any of several critical temperatures, the so-called $AC_1$–$AC_4$ points. The grain structure/ductility is thus adjusted by a heat treatment of the part, raising it to a predetermined temperature and then quenching it in accordance with the desired characteristics of the finished product.

For specific parts, however, it is desirable for the grain structure to vary from one region to another. One region might need to have exceptional strength while another might need to be able to deform somewhat. This can be accomplished most simply by making the part as a composite of two pieces that are differently treated to have the desired characteristics.

U.S. Pat. No. 5,972,134 describes a one-piece part having regions of different ductility. It is produced by heating it locally before deforming it into the desired shape and then cooling it. The disadvantage of this method is that it is a complex batch operation that does not lend itself to the mass production needed for motor-vehicle manufacture.

German utility model 200 14 361 published 16 Nov. 2000 describes a door post or so-called B-column that is rendered austenitic in a furnace and then is simultaneously deformed and quenched in a die. Some parts of the workpiece are insulated before it is put in the furnace so that they do not become austenitic and thus do not develop a martensitic grain structure. Such a process is also unwieldy, involving the application and removal of insulation before and after the heat treatment, two extra steps that considerably elevate the cost of the workpiece.

Complicating the problem of making a part with regions of different ductility is the necessity of coating one of the parts, in particular when a corrosion-resistant coating, like zinc or aluminum, is applied hot. When a workpiece needs to be constructed having two regions of different ductility and also needs to be corrosion coated, the problems multiply, making for a very expensive manufacturing process.

In copending application Ser. No. 10/744,773 filed 23 Dec. 2003 a hardenable steel workpiece having two regions is first hardened so that both regions are of generally the same low ductility. Then only one of the regions is hot coated so as to increase the ductility of the one region while not heating and changing the ductility of the other region. This procedure is relatively effective but fairly cumbersome.

Another consideration is that some parts, particular of motor vehicles, have different requirements as to corrosion resistance in different regions of the part. For example the lower region of a B-column often needs a very good hot-zinc corrosion protection while its upper region is often sufficiently protected by the paint or lacquer that is normally applied to all parts. Such a B-column often needs, as mentioned above, to have a fairly ductile foot region so that in an accident it can bend while its upper region needs to be very strong to support the roof in a rollover. Creating such a part that has regions of different ductility and regions that do not need corrosion coatings is particularly complex.

Applying a coating after heat-treating a workpiece is somewhat problematic since the heat of the coating process can detemper it. As mentioned above with reference to the copending application, this fact can be exploited so that in effect the ductility-decreasing heat-treatment is effected by the coating process. But this is not always the case and it is often the case that the coating must be applied to a part of low ductility and high strength. For example, one cannot anneal a hot-dipped galvanized piece of steel, as the high temperature of the heat-treatment process reliquefies the zinc and leaves the finished product at least partly uncoated. The coating often is vaporized so that not only does the heat treatment destroy it, but it stains or damages the underlying metal.

OBJECTS OF THE INVENTION

It is therefore an object of the present invention to provide an improved method of making a coated workpiece having regions of different ductility.

Another object is the provision of such an improved method of making a coated workpiece having regions of different ductility which overcomes the above-given disadvantages, that is which is relatively simple, yet which ensures that the regions that need to be coated are thoroughly coated while those that do not need to be coated are completely clean, and at the same time different regions of the workpiece can have different ductility.

SUMMARY OF THE INVENTION

A workpiece having regions of different ductility is made by first coating opposite faces of a flat sheet-metal workpiece of low ductility and then stripping the coating from the faces in one region of the workpiece while leaving the coating on the faces in another region of the workpiece. The workpiece is then deformed into a three-dimensional profile. Only the one uncoated region of the workpiece is heated and thereby hardened while not significantly heating the other coated region of the workpiece.

The instant invention is based on the discovery that it is far easier to strip a protective coating from a flat workpiece prior to shaping and partially hardening it, than to coat it after shaping and hardening it or deal with the coating on the region needing to be hardened. In particular when according to the invention the workpiece is a plate cut from a strip of mild steel, it is possible to make a part having regions of different ductility, with the more ductile region carrying a protective coating.

The flat sheet-metal workpiece is coated in accordance with the invention by galvanizing. This coating is stripped according to the invention by rotary brushes, and can even be reused.

Normally according to the invention the steps of deforming and heating take place simultaneously. Thus as the workpiece is given its final shape, part of it is heated, e.g. inductively, to harden it.

With this system it is possible to produce a high-quality a motor-vehicle B-column can be produced having a galvanized high-ductile foot region and an uncoated upper stem region of extreme hardness, that is low ductility.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
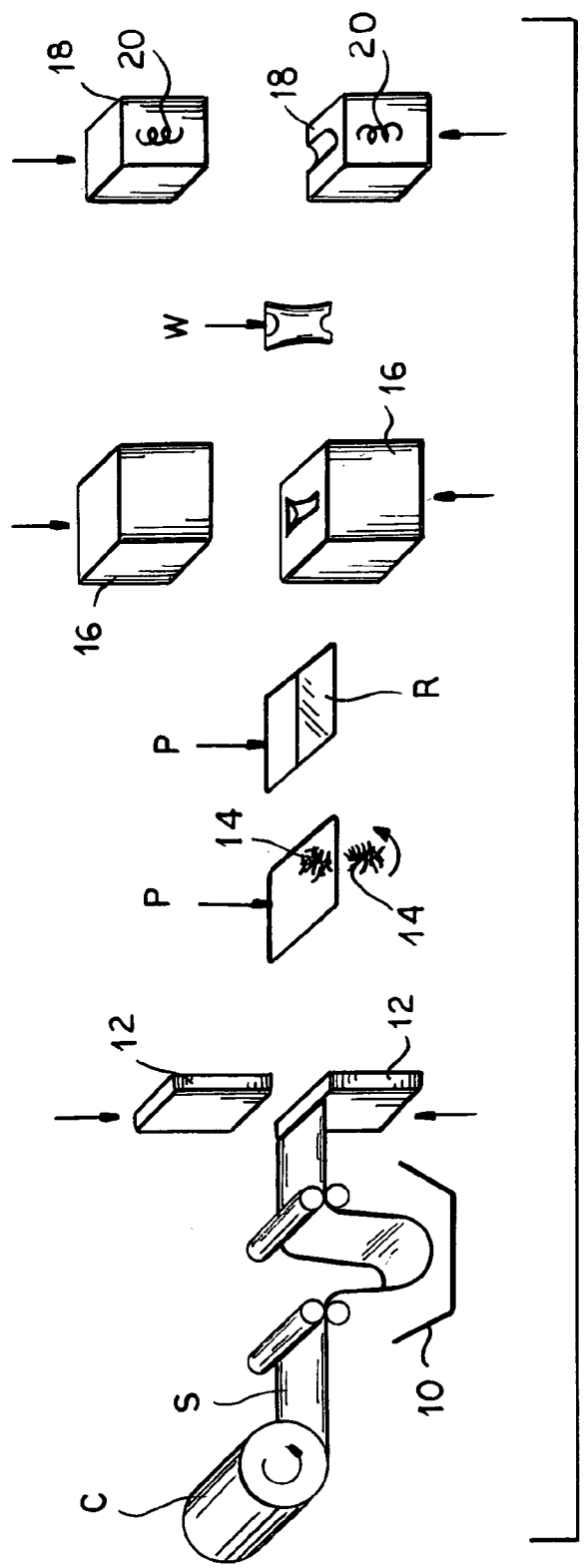
FIG. 1 is a largely diagrammatic illustration of the method of this invention.

As seen in FIG. 1 a strip S of relatively ductile sheet steel is pulled off a coil C and run through a galvanizing bath 10 that coats both faces and edges of the strip S with a thin layer of zinc. The strip S is then cut transversely by a pair of blades 12 into a plate workpiece P that is run between two short rotary brushes 14 that scrape all the zinc coating off the plate P in a region illustrated at R, leaving the zinc coating intact on the rest of the plate P.

Then the partially coated plate P is shaped between a pair of dies 16 into a three-dimensional workpiece W. The portion of this workpiece W corresponding to the stripped region R of the plate P is then fitted to a cavity of another pair of dies 18 provided with an inductive heater illustrated at coils 20 to simultaneously impart a final shape to the uncoated part and heat harden it. A quenching stage can follow, depending on the type of the treatment. The heat-treatment/shaping effected in the dies 18 does not significantly heat the coated portion of the workpiece w sticking out of the dies 18, so that they remain relatively ductile.

Figure 2:
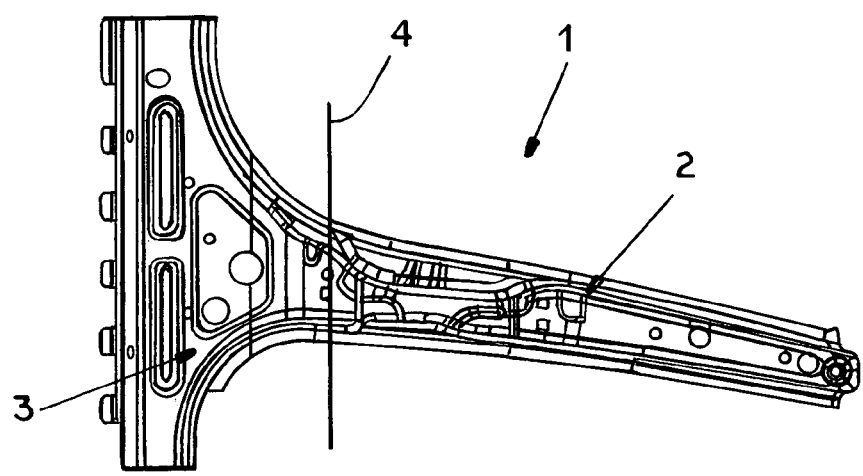
FIG. 2 is a small-scale view of a finished product according to the invention.

As shown in FIG. 2 the finished part 1 is a motor-vehicle B-column having to one side of a dividing line 4 an upper portion 2 and to the other side a foot portion 3. The upper portion 2 corresponds to the region that was stripped of the coating and hardened, and the portion 3 remains galvanized and has the same general ductility an the strip S from which the part 1 was made.

I claim:

1. A method of making a workpiece having regions of different ductility, the method comprising the steps of:
   coating opposite faces of a flat sheet-metal workpiece of low ductility;
   stripping the coating from the faces in one region of the workpiece to form an uncoated region while leaving the coating on the faces in another region of the workpiece;
   deforming the workpiece into a three-dimensional profile; and
   heating and thereby hardening only the one uncoated region of the workpiece while not significantly heating the other coated region of the workpiece.

2. The method defined in claim 1 wherein the flat sheet-metal workpiece is coated by galvanizing.

3. The method defined in claim 1 wherein the coating is stripped by brushes.

4. The method defined in claim 1 wherein the steps of deforming and heating take place simultaneously.

5. A method of making a motor-vehicle B-colum having regions of different ductility, the method comprising the steps of:
   cutting a flat plate workpiece from a strip of sheet steel of low ductility;
   hot coating opposite faces of the plate workpiece with zinc;
   stripping the zinc coating from the faces in one region of the workpiece to form an uncoated region while leaving the coating on the faces in another region of the workpiece;
   deforming the workpiece into a three-dimensional profile; and
   heating and thereby hardening only the one uncoated region of the workpiece while not significantly heating the other coated region of the workpiece.

* * * * *